Sept. 8, 1970　　　H. H. AIKEN ET AL　　　3,527,588
BEADING MACHINE
Filed Dec. 15, 1967　　　　　　　　　　　　5 Sheets-Sheet 1

INVENTORS
HOWARD H. AIKEN, ALLAN L PARVIN,
CHARLES M. TAITEL, THEODOR FESTNER
SEYMOUR JANOWSKY, HAROLD SKURNIK

By Sughrue, Rothwell, Mion,
Zinn & Macpeak
ATTORNEYS

Sept. 8, 1970   H. H. AIKEN ET AL   3,527,588
BEADING MACHINE
Filed Dec. 15, 1967   5 Sheets-Sheet 2
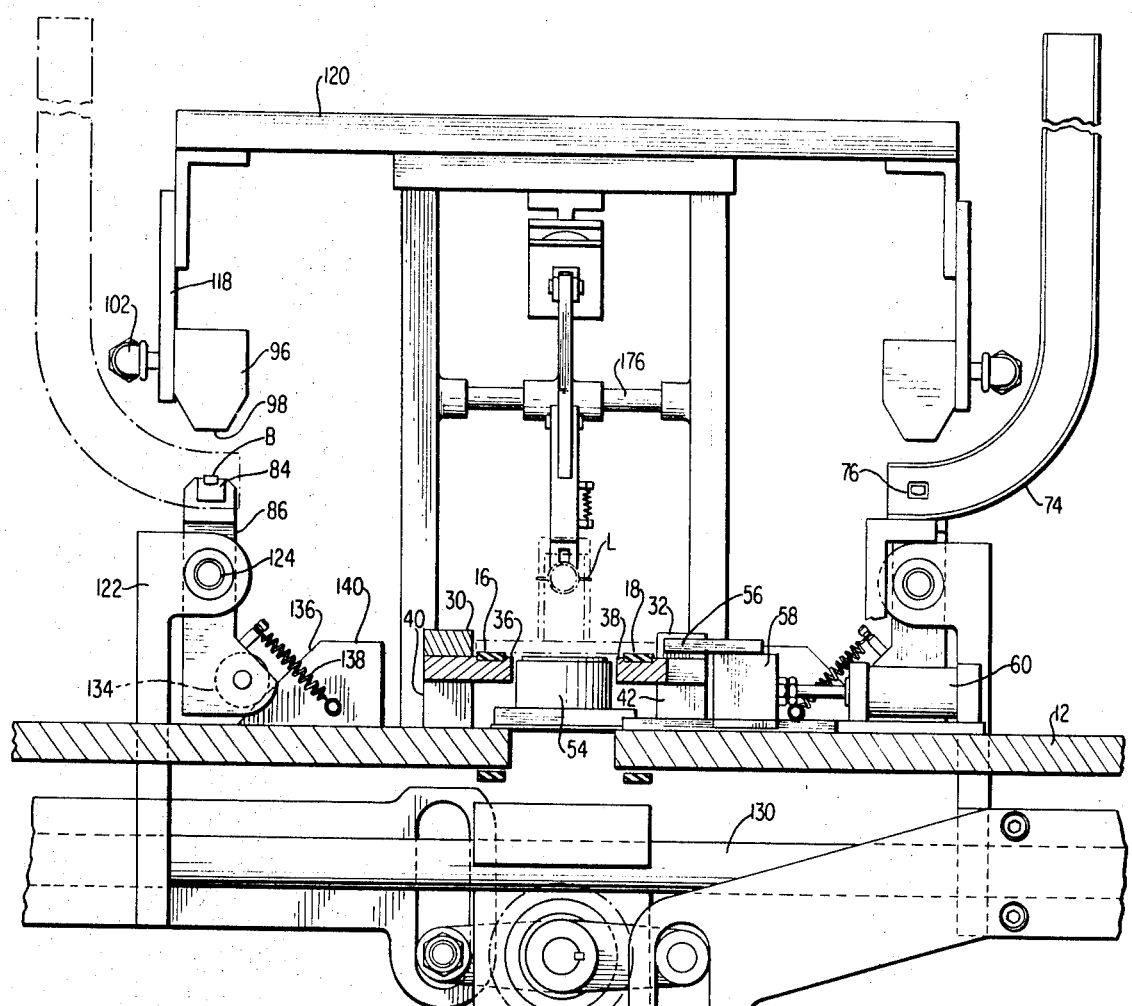
FIG. 3
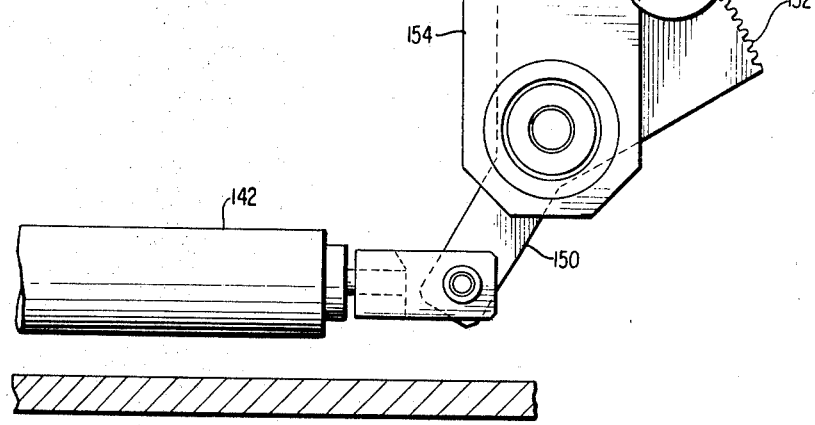
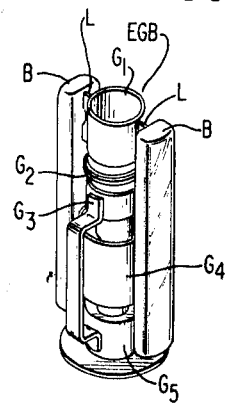
FIG. 2

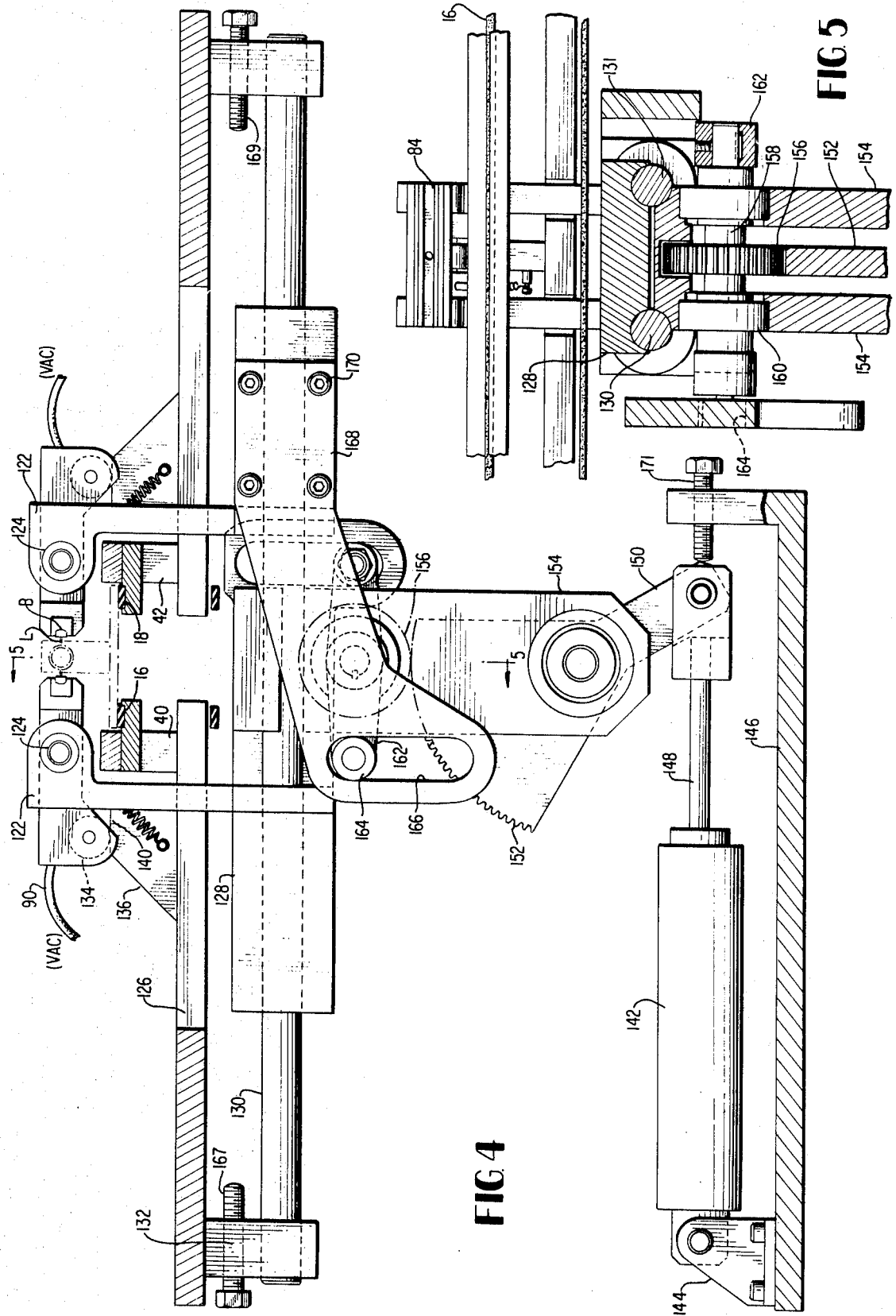

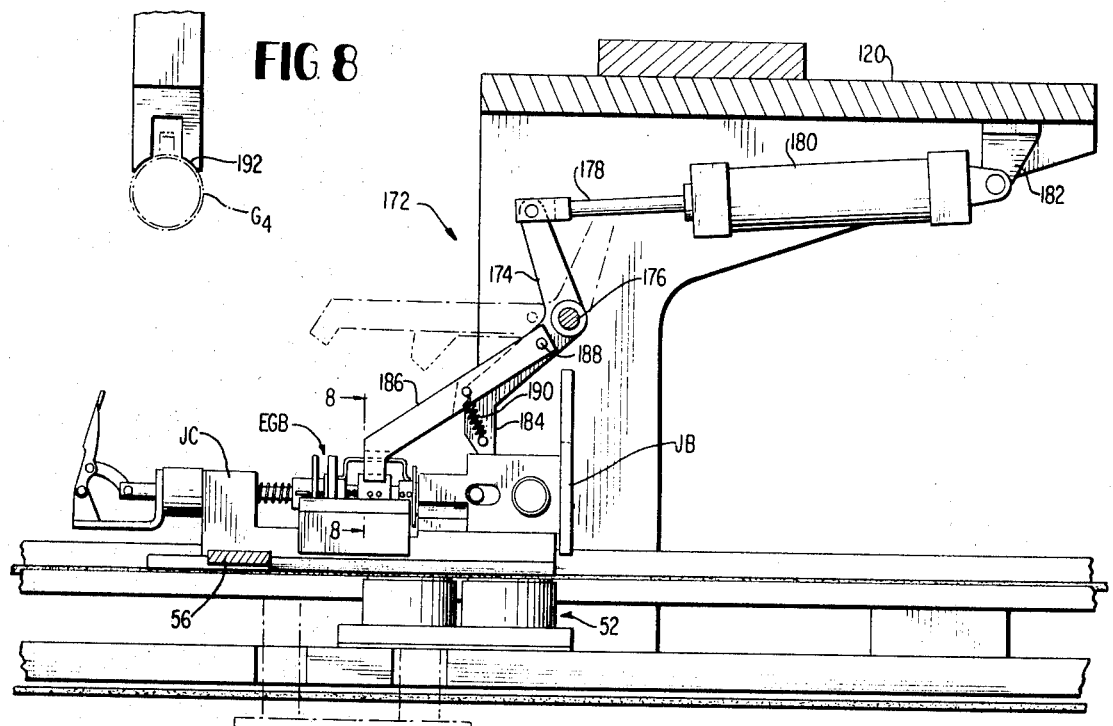
FIG. 8
FIG. 7
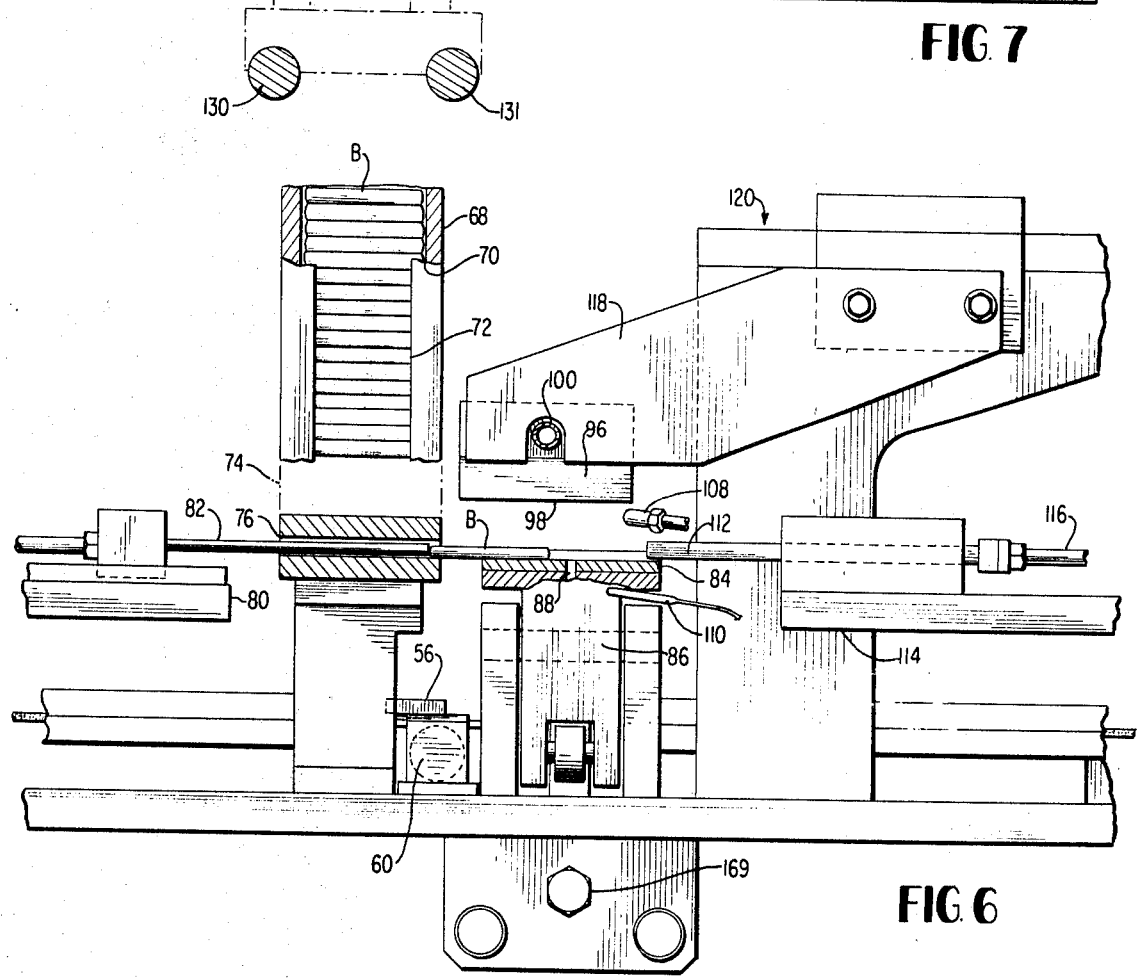
FIG. 6

United States Patent Office 3,527,588
Patented Sept. 8, 1970

3,527,588
BEADING MACHINE
Howard H. Aiken, Fort Lauderdale, Fla., and Allan I. Parvin, Clifton, Charles M. Taitel, Lake Hiawatha, Theodor Festner, Upper Saddle River, Seymour Janowsky, Clifton, and Harold Skurnik, Bloomfield, N.J., assignors to Aiken Industries, Inc., Leonardtown, Md., a corporation of Delaware
Filed Dec. 15, 1967, Ser. No. 690,824
Int. Cl. C03b 23/14
U.S. Cl. 65—154                              12 Claims

ABSTRACT OF THE DISCLOSURE

A beading machine automatically applies glass beads to electron guns. In the machine a conveyor moves a succession of electron gun assemblies which have been clamped on jigs to and through a beading station. The jigs are stopped and the guns aligned and referenced at the beading station. Glass feed magazines on each side of the beading station supply glass beads which are fed from the magazines to bead holders underneath gas burners. On movement of a jig and clamped gun electrodes to the beading station, glass is fed to the bead holders, the burners ignited, the beads softened by heat and a bead holder drive mechanism moves the beads into contact with lugs on the electrodes. The entire machine has fully automatic controls.

BACKGROUND OF INVENTION

Field of art

This invention relates to improvements in glass beading machines and particularly to fully automatic glass beading machines for applying glass beads to electron guns used in cathode ray tubes.

Prior art

Electron guns used in cathode ray tubes, especially of the type in home television receivers, are produced in great quantity. The guns include a plurality of spaced electrodes which are aligned and held rigidly in the desired spacial and aligned relationship by glass beads applied to lugs extending from the electrodes. In electron guns for black and white television tubes there is a single set of electrodes with glass beads applied to opposite sides thereof, while for color television tubes there are three sets of electrodes which are rigidified by three glass beads around the outside of the assembly of three sets of electrodes.

It has been known in the art to apply glass beads in a semi-automatic manner to electrodes, especially for color television tubes. See, for example, the application of Seymour Janowsky, Ser. No. 537,775, filed Mar. 28, 1966, now abandoned and assigned to the assignee of this invention. In such known prior art, however, the operation is only semi-automatic in that the electrodes must be manually positioned at a beading station and manually removed from a beading station and the beading operation manually initiated. This, of course, requires some labor and skill on the part of the labor and also is not as efficient or inexpensive as it would be in a fully automatic operation. Hitherto, however, it was not thought possible or feasible to fully automate the beading operation in the manufacture of electron guns.

SUMMARY OF INVENTION

With this invention the glass beading operation carried out on electrodes supported by a jig is fully automated. To accomplish this result a beading machine includes a conveyer on a base for continuously conveying a succession of electron gun assemblies clamped on a jig to and through a beading station. A stop is provided at the beading station for holding the jig and gun assembly while beading. Two glass feed magazines are positioned on opposite sides of the feeding station as are two gas burners. A mechanism feeds the glass beads from each magazine to a cradle beneath each burner and the burner softens the bead and then a bead applying mechanism moves the beads from under the burner into contact with the lugs on the electrodes at the beading station. The machine has fully automatic controls.

BRIEF DESCRIPTION OF DRAWINGS

The invention will be described in connection with the accompanying drawings in which:

FIG. 2 is a perspective view of a beaded electron gun body which is the product of the machine of this invention.

FIG. 3 is a transverse sectional elevation view taken along line 3—3 of FIG. 1.

FIG. 4 is a transverse sectional elevation view similar to FIG. 3 but showing the drive components in a different position.

FIG. 5 is a sectional elevation view taken along line 5—5 of FIG. 4.

FIG. 6 is a side elevation view partially in section and taken in the direction of line 6—6 of FIG. 1.

FIG. 7 is a sectional elevation view taken along line 7—7 of FIG. 1.

FIG. 8 is a detail elevation view taken in the direction of line 8—8 of FIG. 7.

DESCRIPTION OF PREFERRED EMBODIMENT

Figure 1:
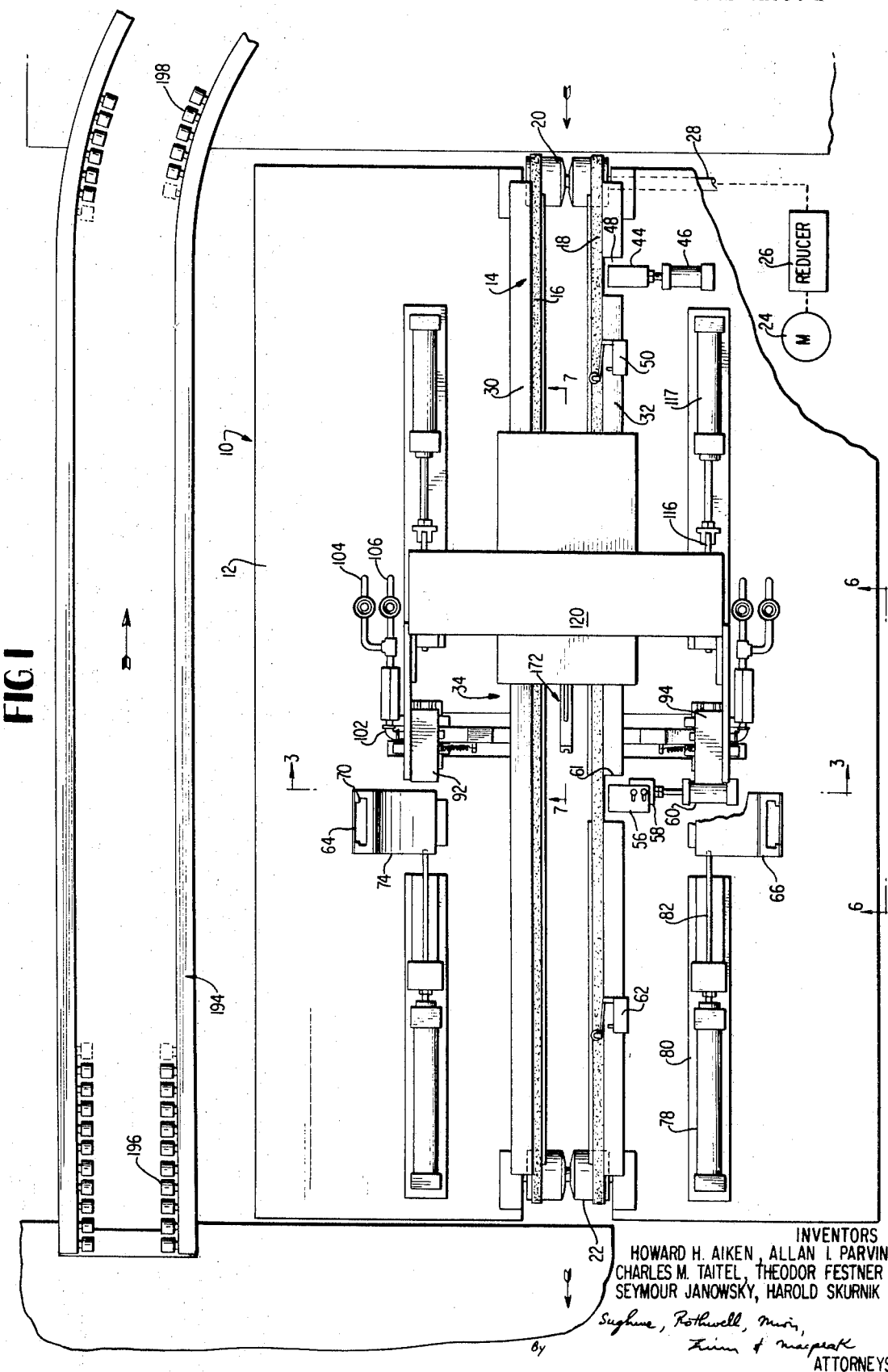
FIG. 1 is a top plan view of the entire beading machine of this invention with portions broken away for the sake of clarity.

The beading machine of this invention is constructed on a suitable base 10 which includes a table top 12 with a gap therein for mounting a conveyer 14.

The conveyer 14 includes a pair of spaced apart driven friction belts 16 and 18 trained over driving pulleys 20 and driven pulleys 22 at the entrance and exit ends of the machine, respectively. The conveyer is driven from a motor 24 through a reducer 26 and drive shaft 28 connected to the driving pulley 20. The belts are adjacent and below side rails 30 and 32, see FIGS. 1 and 3, and these side rails guide the jigs being conveyed on the belts 16 and 18 from the entrance end of the machine through a beading station 34 at which glass beads are applied and on to the exit end of the machine. The side rails are on top of belt supports 36 and 38, see FIG. 3, and these are supported above table 12 by blocks 40 and 42.

An electron gun body, EGB, is shown in FIG. 2. The gun body has five spaced apertured electrodes G1, G2, G3, G4, G5 as is known in the art, and these electrodes are aligned and appropriately spaced in an assembly operation on a jig base $J_B$ (FIG. 7.) The electrodes are clamped in their aligned and assembled position by a jig clamp $J_C$ clamped to the jig base and itself clamping the electrodes. The machine of this invention automatically applies glass beads B, B, FIG. 2, to lugs L extending from the outer surfaces of the electrodes. After softening the flat faces of the beads B, B by heat they may be pushed onto the lugs L and when the glass hardens they rigidify the spaced aligned assembly of electrodes and the completed assembly of FIG. 2 is known as an electron gun body. The beads B have their curved surfaces extending outwardly for contact with the neck of a cathode ray tube. The jig base $J_B$ and jig clamp $J_C$ are exemplary of types of jig arrangements which could be used with the beading machine of this invention, but this invention is not dependent upon the use of this specific jig. Specific jigs shown in FIG. 7 are described in more detail in copending application Ser. No. 688,599, filed Dec. 6, 1967, and assigned to the assignee of this invention.

The jig is conveyed by the conveyer 14 through the machine and in the course of being conveyed may be stopped at the entrance of the machine before the beading station by an entrance stop 44 projectable by a cylinder 46 mounted on table 12 through a gap 48 in side rail 32 into the path of the jig for stopping the jig should there be another jig in the beading station 34. An entrance switch 50 follows the stop 44 in the direction of movement of the jig and is positioned to be actuated by the movement of a jig past it to initiate the beading operation.

The jig is stopped, precisely aligned and held down in reference position at the beading station 34 by a suitable stop means including an electromagnet assembly 52 having a pair of electromagnets 54 and a stop plate 56 adjustably mounted on block 58. The stop plate is projectable through gap 61 in side rail 32 into the path of the jig on the conveyer 14 by a cylinder 60 to precisely reference the jig by positive contact with the jig. An exit switch 62 is also mounted on side rail 32 following the beading station and stop 56. When a jig carrying a completed electron gun body, i.e., an assembly of beaded electrodes, passes the switch 62 it activates the same and indicates that the beading station 34 is clear to receive automatically another jig of aligned electrodes to be beaded.

The glass beads B are stored in magazines and fed one at a time for softening by gas burners and subsequent automatic application to the lugs on the assembled aligned electrodes. For the purpose of storing the glass beads there are a pair of glass bead magazines 64 and 66 on opposite sides of the conveyer 14 adjacent the beading station 34. Since each magazine is the same, only one will be described in detail. The glass feed magazine includes a generally upright member 66 having a channel 70 therein with an open face 72 facing outwardly of the conveyor 14. A number of glass beads B are assembled with their curved sides facing outwardly and are taped together by suitable masking tape so that they may be handled as a unit and slipped into the channel 70 from the top. The tape is then stripped off the beads. The member 68 has a curved lower end 74 with no exit for the beads except exit hole 76 extending transversely therethrough, see FIGS. 3 and 4. After a number of glass beads have been placed in the channel 70 and the tape stripped therefrom the beads will feed themselves by gravity so that one bead at a time will always be in the lowest position of the channel and ready to be fed out exit hole 76.

For feeding the glass beads from the magazine one at a time there are a pair of glass bead feed cylinders but again only one need be described in detail. Bead feed cylinder 78 is mounted on base 80 from table 12 and includes an elongated pusher 82 attached to the piston rod. The pusher 82 is axially aligned with hole 76 and is movable on actuation of cylinder 78 therethrough to push a glass bead B out of exit hole 76 and onto a bead holder 84. The cylinder 78 then retracts pusher 82 and the next bead falls into position to be fed onto the cradle.

The bead holder 84 includes a cradle 85 on the top surface of a pivoted member or arm 86 and has a vacuum hole 88 therein for the application of vacuum to the curved undersurface of the bead through vacuum connection 90, FIG. 4, to hold the glass bead in precisely predetermined aligned position while member 86 is moved to apply the softened bead to the lugs.

The flat surface of the bead is heated for a predetermined period of time by intense heat from a pair of gas burners 92 and 94. Again the burners are identical and only one need be described in detail. Each burner has a burner body 96 with burner ports 98 in the bottom surface edge thereof. A gas inlet connection 100 supplies burner gas to the inside of burner body through a gas pipe 102 connected to pipes 104 and 106 for supplying hydrogen and oxygen to the burner. Hydrogen and oxygen make a very hot flame capable of softening the flat surface of the glass bead quickly.

A pilot burner 108 is provided for lighting the gas burner. A thermocouple 110 is positioned adjacent the outer edge of the cradle 84 and if the thermocouple does not detect the flames bouncing off the surface of the glass bead B in a preset number of seconds, the burner is shut down because this would indicate that no bead is in the cradle and the flames do not bounce off as they do when a bead is in the cradle. The lack of a bead causes the thermocouple to initiate a signal which stops the automatic operation. Another thermocouple may be provided for the pilot burner as is known in the gas burner art. Each burner is supported by a burner bracket 118 connected to a bridge 120.

For accurately referencing the bead B in cradle 84 there is a glass stop member 112 mounted on a support 114 and positionable by a piston rod 116 of cylinder 117, see FIGS. 1 and 6. The glass stop member 112 determines the longitudinal position of the glass bead B on the cradle 88 prior to its being heated by the flame from burner ports 98.

As shown in FIG. 3, the glass beads B have their flat surface upright and the arm 86 is upright when the beads are heated by the gas burners. As shown in FIG. 4, however, the beads have to be rotated 90° and moved toward each other in order to position the softened surface around the lugs L of the electrodes. The drive mechanism for driving arm 86 is shown in FIGS. 3–5. Each arm 86 is mounted on a movable post 122 about a pivotal axis 124. The axes 124 of both posts 122 are on the same horizontal level as the lugs L of the electrodes. Each post 122 extends through a slot 126 in the table for movement toward and away from the axis of the conveyer 14. Each post 122 is connected to a collar 128 and the collar is longitudinally slidable on rods 130, 131 mounted on bracket 132. Each arm 86 has a cam follower roller 134 at one end thereof and this roller cooperates with the inclined surface of a stationary cam 136, see FIG. 3. A spring 138 attached to the stationary cam and arm 86 biases the roller 134 into engagement with the cam. The cam 136 has a horizontal upper level 140 on which the roller 134 also rolls, see FIG. 4.

As can be seen, movement of the posts 122 toward each other transversely of the axis of the conveyer 14 from the position of FIG. 3 to the position of FIG. 4 will cause the arms 86 to pivot carrying the beads B into horizontal position and allowing them to be inserted onto the lugs L of the electrodes. To accomplish this driving action, a drive mechanism shown in FIGS. 3, 4 and 5 is provided. This drive mechanism includes a drive cylinder 142 pivotally mounted on a bracket 144 from a shelf 146 of the base. A piston rod 148 has its end pivotally connected by a yoke to a lever 150 extending from a gear sector 152. The gear sector 152 is pivotally mounted between a pair of depending supports 154, 154 and the teeth on sector 152 are in mesh with a pinion 156. Pinion 156 is keyed to a shaft 158 which in turn is journaled by bearings 160 in supports 154. A pair of arms 162 are keyed to the ends of shaft 158 and have extending outwardly therefrom roller members 164. The roller members 164 roll in slots 166 of members 168 which in turn are secured by screws 170 to the bushings 128. An adjustable stop 171 limits the forward stroke of cylinder 142 thus setting the dimension between the outside surfaces of the glass beads in the finished gun body. Adjustable stops 167, 169 limit the back travel of collars 128, thus setting the bead holders 84 exactly in line with the bead exit holes 76 in the magazines.

In the retracted position of rod 148, sector 152 is in the position of FIG. 3, and posts 122 are separated to the widest extent causing the arms 86 to be upright so that the beads B can have their flat surface heated by the burners and can be loaded from the magazines. On the initiation of a proper signal after six seconds of heating by the burners, the cylinder 142 projects the rod 148 shifting the gear sector 152 to the position shown in FIG. 4. This rotates the pinion 156 and rotates the arms 162 180° clockwise causing the bushings 128 to move toward each other to the position of FIG. 4. When the posts 122 move toward each other the stationary cams 136 cause the arms 86 to pivot to a horizontal position and the top surface 140 of the stationary cams 136 causes the arms 86 to continue to assume the horizontal position as they move inwardly to apply the beads B to the lugs L.

For referencing the electron gun body EGB and holding down the jig body $J_B$ during the beading operation, a referencing and hold down assembly 172 is provided, see FIG. 7. This assembly includes a lever 174 pivotally mounted on a pivot shaft 176 extending transversely between walls of the bridge 120. The hold down and referencing assembly is actuated by a piston rod 178 connected to lever 174 and driven by cylinder 180 which is pivotally secured by bracket 182 to bridge 120. The lower end of arm 74 includes a jig hold down portion 184 which bears against the surface of the jig as shown in FIG. 7 in the full line position. An electrode referencing finger 186 is pivoted to lever 174 at pivot 188 and is biased by spring 190. When the cylinder 180 projects the piston rod 178 the arm 174 moves from the phantom line position to the full line position of FIG. 7, the finger 184 bears on the surface of jig base $J_B$ and the finger 184 references, aligns and spaces the electrode G4 which is loose in the assembly of electrodes G3, G4, G5. The end 192 of finger 186 is curved to bear on electrode G4 shown in FIG. 8.

A return conveyer 194 is provided for returning the jig clamp $J_C$ after it is unclamped from the jig base $J_B$ following the beading of the electron gun body. The return conveyer includes rollers 196 which at the entrance end are at a higher elevation than the rollers 198 at the exit end of the roller return conveyer. The direction of travel of the jig clamps on the return conveyer is opposite to the direction of travel of the jig and clamp during the beading operation through the beading station 34.

Figure 9:
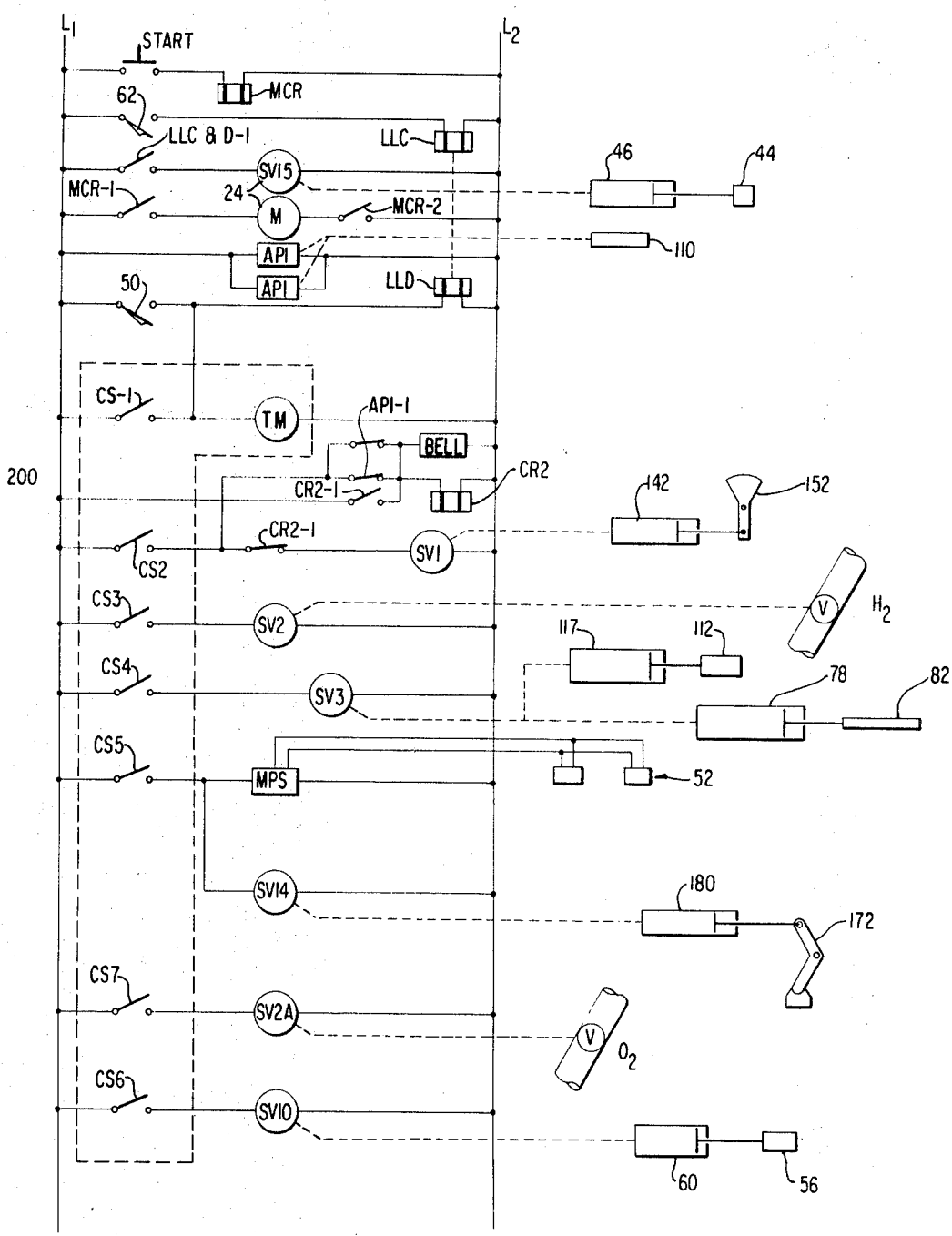
FIG. 9 is an electrical circuit diagram.

It is believed that the operation of the invention will be apparent from the foregoing but a brief résumé will now be given in connection with the electrical circuit diagram of FIG. 9.

A plurality of electrodes are aligned and spaced apart on the jig base $J_B$ and clamped in aligned position by jig base clamp $J_C$. The start switch is actuated and relay MCR starts motor 24 through contacts MCR–1 and 2, and the motor drives the conveyor. Then the jig is sent through the beading machine by conveyor belts 16 and 18. If another jig has not cleared switch 62 after the beading station 34 stop 44 will be projected. On the other hand, stop 44 is retracted when a jig passes and closes switch 62 thereby activating latch relay LLS. The newly released jig activates switch 50 to reset latch relay LLD and initiate the feed of the glass beads onto bead holder 84, the igniting of hydrogen-oxygen gas from the burners, and the movement of the softened beads onto the lugs by starting the timing motor TM of clock 200. At the time the jig reaches the beading station 34 it is stopped positively by stop 56 in precise predetermined position and held in place by electromagnet assembly 52. Stop 56 is actuated under control of clock switch CS6 through solenoid valve SV10. The electromagnet is controlled by CS5 and magnet power supply MPS. A jig ejector, not shown, may be used to overcome residual magnetism and to start the jig moving. The jig ejector may be a cylinder operated tapping lever controlled by SV10 equal and opposite to jig stop 56. G4 is referenced and the jig is held down by hold down assembly 172 under control of CS5 and SV14. In the meantime glass feed cylinders 78 have projected feed rods 82 into holes 76 feeding glass beads B into bead holders 84 with their curved surface downwardly, under control of clock switch CS4 and solenoid valve SV3. The beads are aligned and referenced longitudinally in the cradle by glass bead stop 112 under control of CS4 and SV3 and are held down by vacuum applied through vacuum connection 90 and holes 88. The burners 92 and 94 are lit by pilot 108 after turning on the supply of hydrogen and oxygen under control of CS3, CS7, SV2, and SV2A and they project a flame downwardly to heat the flat surface of the glass bead for a precise number of seconds until the surface has sufficiently softened. The burner gas is then turned off and the drive mechanism of FIGS. 3 and 4 is activated by energizing cylinder 142 through CS2, CR2–1, and SV1 to pivot arms 86 from vertical to horizontal position and cause the arms to move inwardly to apply the beads B as shown in FIG. 4. If a glass bead B was not in cradle 85 thermocouple 110 would have detected this condition at the time the burners were lit and the cycle would have automatically stopped and an alarm sounded by virtue of AP1 not opening contacts AP1–1. CR2 then opens contacts CR2–1 stopping cylinder 142 and locks in through contacts CR2–2. After the beads have been applied the components are held in the position of FIG. 4 a short period of time until the beads harden, the cylinder 142 is energized to retract rod 148 and the components again move back to the position of FIG. 3 ready to receive additional beads for heating for the next jig. The jig with the completed electron gun body is released by withdrawing stop 56 and de-energizing electromagnet assembly 42 allowing the continuously moving conveyor belts 16 and 18 to carry the jig past microswitch 62. When the jig passes this switch LLC and LLD close contacts LLC&D–1 allowing stop 44 to be retracted via SV15 and another jig to be fed to beading station 34. The jig clamp $J_C$ is removed from the jig base $J_B$ and recycled on return roller conveyor 194.

While the invention has been particularly shown and described with reference to a preferred embodiment thereof, it will be understood by those skilled in the art that various changes in form and details may be made therein without departing from the spirit and scope of the invention.

We claim:
1. A fully automatic glass beading machine for applying glass beads to electron guns, the machine comprising:
   (a) a base,
   (b) a conveyor on the base capable of conveying a succession of electron gun assemblies clamped on jigs to and from a beading station,
   (c) stop means adjacent the conveyor at the beading station for holding the jig and electron gun assembly in referenced position during beading,
   (d) at least two glass bead feed magazines adjacent the beading station,
   (e) at least two gas burners, one adjacent each glass feed magazine on opposite sides of the conveyor at the beading station,
   (f) glass bead feed means for feeding glass beads one at a time from each magazine to a bead holder adjacent the burner so that the beads may be heated to a softening temperature by flames from the gas burner,
   (g) a bead holder drive mechanism for moving the bead holder, after heating of a bead, by the burner, into contact with lugs on opposite sides of the gun assembly at the beading station, and
   (h) fully automatic controls for the stop means, bead feed means, burners, and bead holder drive mechanism.

2. A machine as in claim 1 wherein the conveyer is horizontal and further comprising:
   (i) a bridge extending over the conveyer from the base at the beading station,
   (j) a referencing and hold down assembly extending from the bridge to contact and reference an electrode of the gun and contact and hold down the jig during the beading operation.

3. A machine as in claim 1 wherein the stop means includes an electromagnet positioned adjacent the conveyer at the beading station, and a mechanical stop projectable outwardly into the path of the jig on the conveyer.

4. A machine as in claim 1 wherein the glass bead feed means includes a pusher bar positioned beside the magazine and longitudinally aligned with the lowest bead in the magazine, the pusher bar projectable to move the lowest bead in the magazine longitudinally and axially onto a cradle which is part of the bead holder and is beneath the burner.

5. A machine as in claim 4 wherein the gas burners are positioned to project flames downwardly onto one surface of the glass beads on the cradle, and further including a pilot burner to ignite the gas burners.

6. A machine as in claim 5 further comprising: flame detector and burner shut-off means for shutting off the gas burners a predetermined short period of time after they ignite if no glass bead is in the cradle.

7. A machine as in claim 1 wherein the bead holder drive mechanism includes a cradle adjacent each burner, a pivoted arm carrying the cradle, and a drive cam for pivoting the arm to move the cradle to apply the bead to the lug, the automatic controls including a timer actuated by ignition of the burner to cause the mechanism to move the bead a predetermined period of time after the burner ignites, the period of time corresponding to the softening of the glass bead surface.

8. A machine as in claim 1 wherein the bead feed magazines extend generally vertically so that the beads therein are fed to the lowest portion of the magazine by gravity, the magazine bottom constricted to allow one bead at a time to be fed therefrom in the direction of the longitudinal axis of the bead.

9. A machine as in claim 1, further comprising an entrance stop adjacent the conveyer before the beading station, the stop projectable into the path of the conveyer when a jig and gun has not cleared the beading station.

10. A machine as in claim 1 further comprising, a jig clamp return conveyer on the base for conveying jig clamps in the direction opposite the movement of the jig and gun through the beading station.

11. A machine as in claim 1 further comprising, an entrance switch in the conveyer path that is actuated by movement of a jig and gun to the beading station and actuates the automatic controls for initiating a beading operation.

12. A machine as in claim 4 further comprising a selectively positionable bead stop movable onto the cradle for stopping and precisely longitudinally positioning a glass bead on the cradle.

References Cited
UNITED STATES PATENTS

| | | | |
|---|---|---|---|
| 2,950,568 | 8/1960 | Kissinger et al. | 65—154 |
| 3,340,035 | 9/1967 | Hajduk | 65—154 |
| 3,434,819 | 3/1969 | Merchant et al. | 65—154 |

ARTHUR D. KELLOGG, Primary Examiner

U.S. Cl. X.R.
29—25.19; 65—155